April 2, 1935.  A. HARGRAVES  1,996,418
TIRE CONSTRUCTION
Filed Aug. 13, 1934   2 Sheets-Sheet 2
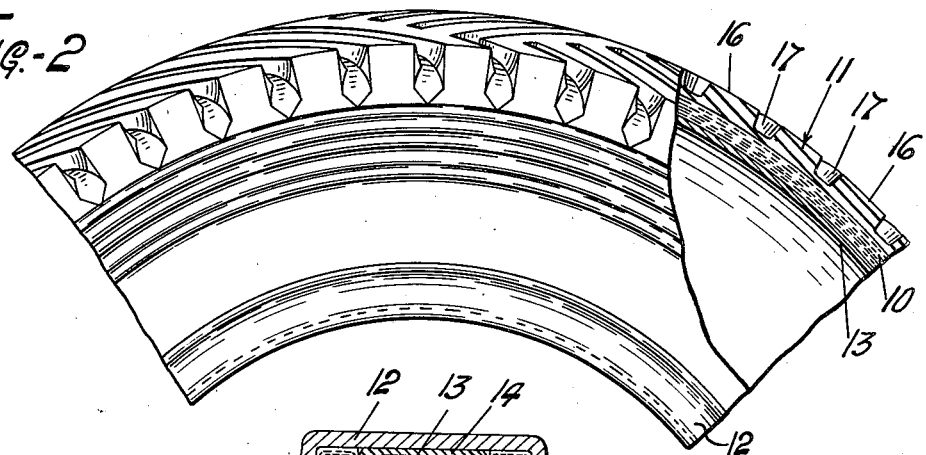
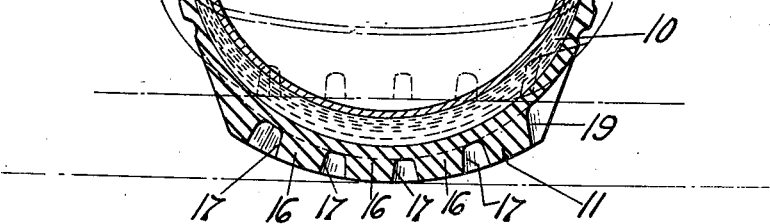
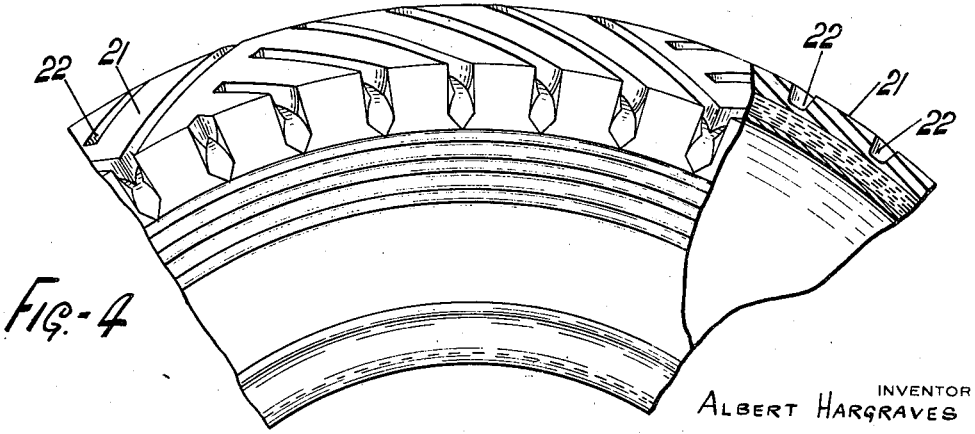
INVENTOR
ALBERT HARGRAVES Patented Apr. 2, 1935

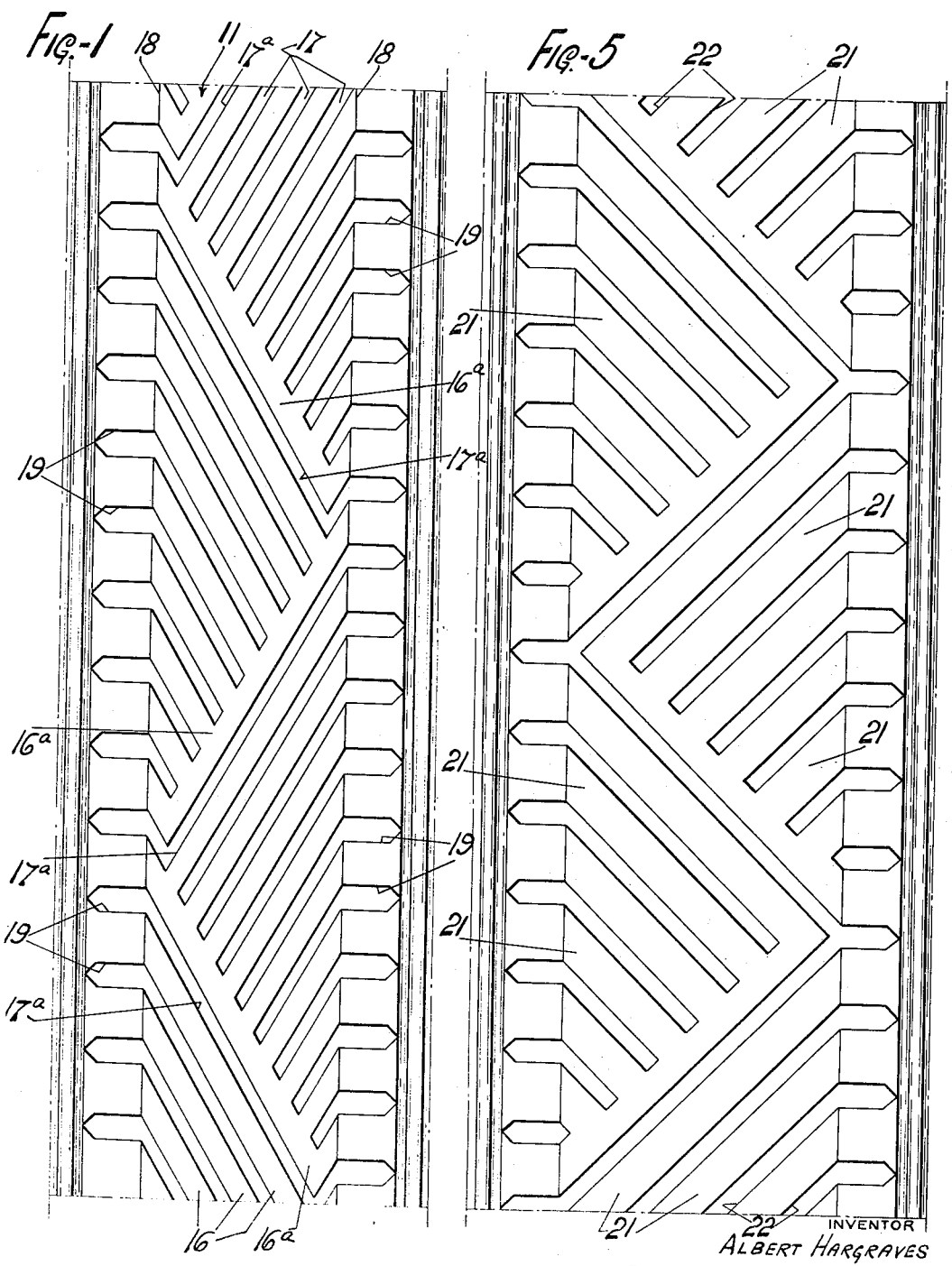

1,996,418

UNITED STATES PATENT OFFICE 1,996,418

TIRE CONSTRUCTION

Albert Hargraves, Silver Lake, Ohio, assignor to The Firestone Tire & Rubber Company, Akron, Ohio, a corporation of Ohio Application August 13, 1934, Serial No. 739,573

5 Claims. (Cl. 152—14)

This invention relates to tire construction and more especially it relates to treads for pneumatic tires, particularly the mechanical features thereof.

In the designing of treads for pneumatic tire casings, many factors require to be considered. Thus the tread design should be such as not to produce undesirable traction or riding noises when the tire is moving over a pavement. The tire should be free to flex longitudinally and transversely without imposing such strains on the tread as to crack the same, or to rupture or strain the carcass of the tire. The tread should have sharp edges so disposed as to resist skidding of the tire in any direction, yet so arranged as not to be subject to "heel and toe" action which wears and rounds off said edges. The tread characters should be symmetrically arranged so that there are no rights and lefts, and the tire functions equally well on either side of a vehicle, yet it is also desirable to have some difference between opposite sides of the tread to avoid setting up periodic vibration in the tire. Furthermore, it is desirable that the tread design include no small, isolated recesses or cavities such as would create a suction as the tire rolls over the pavement, and thus retard movement of the vehicle as well as cause undesirable noise. Lastly, the tread should be such as to provide adequate traction for driving a vehicle.

The chief object of the invention is to provide a tire having a tread that embodies, in part at least, all the aforesaid qualities. Obviously no tire can perfectly fulfill all the conditions set forth, wherefore perfection of some qualities is sacrificed to obtain adequate measure of other qualities, the compromise being controlled to some extent by the type of service for which the tire is intended. A primary object is therefore to devise a tire tread which will avoid tendency to circumferential flex cracking, and at the same time have ample non-skid, traction and noiseless characteristics.

Of the accompanying drawings:

Figure 1 is a developed edge view of a portion of a pneumatic tire embodying the invention, said tire being designed for passenger car use;

Figure 2 is a side elevation thereof, a part being broken away and in section;

Figure 3 is a transverse section of Figure 2;

Figure 4 is a fragmentary side elevation of another pneumatic tire embodying the invention, said tire being designed for use on trucks; and Figure 5 is a developed edge view of the itre shown in Figure 4.

Referring now to the drawings, particularly Figures 2 and 3 thereof, there is shown a pneumatic tire comprising the usual carcass 10 and tread portion 11, the tire being shown mounted upon a rim 12 and provided with an inner tube 13 and flap 14.

The characteristic features of the tread portion 11, which constitute the invention, are best shown in Figure 1 wherein it will be seen that said tread portion comprises successive series or groups of oppositely directed, obliquely disposed ribs 16, 16 defined by intervening grooves 17. The ribs and grooves are disposed at an angle of substantially 30° to the centerline of the tread and those of one group are disposed at substantially 60° with relation to those of adjacent groups. It will be seen that the ribs and grooves of any group are of different lengths. Every groove 17 extends at least to one shoulder or lateral margin 18 of the tread where it merges with or joins a relatively short, radially disposed groove 19 in the side of the tread. The longest groove, designated 17a, of each group connect with respective radial grooves 19 on opposite sides of the tread, and the longest rib, designated 16a, of each group of ribs is connected to the ends of all the ribs 16 of an adjacent group.

Upon casual inspection, the tread shown in Figure 1 appears to be symmetrical. Upon closer examination it will be found that the grooves 19 on the left hand side of the tire are farther apart than those on the right hand side thereof, and the grooves 17 connecting with the grooves 19 on the left hand side of the tire and their intervening ribs 16, are slightly wider than the grooves 17 and ribs 16 that extend to the opposite side of the tire. The arrangement is such that each group of grooves and ribs on the right hand side of the tire contains one more groove and rib than each group on the left hand side of the tire. This asymmetrical arrangement of the tread characters does not destroy the symmetrical appearance of the tire or cause it to function differently when its position on a vehicle is reversed. It does however, prevent the setting up of periodic vibrations or resonances in the tire with its accompanying noises.

From a comparison of Figure 3 with the sectioned portion of Figure 2, it will be seen that the width of respective ribs 16 and grooves 17 is substantially the same both circumferentially and transversely of the tire. Thus the tire will flex equally well in transverse and circumferential directions and flex-cracking largely will be avoided. The position of the tire and tread shown in broken lines in Figure 3 clearly illustrates how the grooves 17 narrow and the ribs 16 move toward each other when the tire is flexed, thus relieving the tread of compressive strains and avoiding destructive tensioning of the carcass plies.

Although the oblique arrangement of the ribs 16 and grooves 17 is not the ideal arrangement for preventing flex-cracking, it is probably the best available compromise in view of the other factors to be considered, especially the problem of noise. The ideal construction for reducing noise is parallel ribs extending circumferentially of the tire. The use of circumferential ribs alone is not satisfactory however, since it does not facilitate longitudinal flexing, does not give sufficient traction, and resists skidding only in lateral directions. In the present invention, the arrangement of the ribs and grooves at an angle of 30° to the centerline of the tire largely eliminates tire noises, yet avoids the disadvantages inherent in the circumferential rib construction.

It will be noted that each group of ribs and grooves is triangular in shape, the apexes of the groups on one side of the tire being reversed with relation to the apexes of the groups on the other side of the tire, the arrangement permitting such positioning of the opposed groups that in normal operation at least two opposed groups always will be in contact with the roadway. Thus the tread configuration will have no directional effect either upon the rolling movement of the tire or upon its skid-resisting qualities.

The tire embodied in the invention resists skidding in all directions, the ribs are so arranged as not to be subject to heel and toe action, and they give ample traction when the tire is rotating in either direction. Moreover, the fact that the ribs are obliquely disposed and terminate at the sides of the tire serves to break up the "traction wave" which is present in tires having circumferential ribs on their treads. Aside from the compromise mentioned, whereby both noise and flex-cracking largely are eliminated, the tire is ideally constructed for achieving the other characteristics necessary to a long-wearing, easy-riding and safe tire.

In the embodiment of the invention shown in Figures 4 and 5, the tread portion of the tire is formed with oblique ribs 21 and intervening grooves 22. This embodiment of the invention differs from that previously described principally in the angle of the ribs and grooves, which is 45° with relation to the centerline of the tire tread. The ribs and grooves are arranged in triangular opposed groups as in the previously described embodiment, the ribs and grooves of one group being disposed at right angles to the ribs and grooves of adjacent groups. Since the ribs 21 are disposed farther from parallelism with the centerline of the tire than are the ribs of the previously described tire, it follows that this tire will be somewhat more noisy than the other. The angle of the ribs, however, brings them nearer to parallelism with a line extending transversely of the tread, which arrangement increases the resistance of the tread to flex-cracking due to longitudinal flexure of the tire.

Thus the invention as shown in Figures 4 and 5 is especially useful for tires used on commercial vehicles wherein the problem of tire noise is of little importance, and sacrifice of this feature is desirable with a view to obtaining greater security against flex-cracking.

Other modifications may be resorted to without departing from the spirit of the invention or the scope of the appended claims, which are not limited wholly to the specific construction shown and described.

What is claimed is:

1. A tire having a tread composed of triangular-shaped groups of parallel diagonal ribs, said groups being arranged in two circumferential series with their bases on one lateral margin of the tread and their apexes at the opposite lateral margin thereof, the ribs of one series being disposed transversely with relation to the ribs of the other series, the ribs of each group being so disposed that the grooves between the ribs are open at the sides of the tread, an additional diagonal rib joined to each of said groups of ribs as to close the ends of the grooves between the ribs opposite the free ends of the sides of the tire tread, the sides of the respective groups in each series overlapping the sides of groups in the opposed series circumferentially of the tire.

2. A tire having a tread composed of triangular-shaped groups of traction elements, said groups being arranged in two opposed circumferential series, each group consisting of a plurality of diagonal parallel ribs of graduated lengths, and a rib disposed transversely of said plurality of parallel ribs and joined with the ends thereof as to close the inner ends of the grooves between said ribs, the outer ends of the grooves between said ribs being open at the sides of the tire tread.

3. A tire having a tread composed of triangular-shaped groups of traction elements, said groups being arranged in two opposed circumferential series, each group consisting of a plurality of parallel ribs disposed obliquely with relation to the centerline of the tread, the ribs of one series being disposed transversely with relation to the ribs of the other series, an oblique rib disposed between adjacent groups, one set of ends of the ribs of each group terminating at the sides of the tread and the other set of ends being joined to said oblique rib between adjacent groups.

4. A passenger automobile tire having a tread constructed with circumferential groups of diagonally disposed nonskid traction ribs, the ribs of successive groups being inclined alternately in opposite directions at approximately 30° from the centerline of the tire and a diagonal rib disposed between adjacent groups, the inner ends of the ribs of each group being joined to said rib between adjacent groups.

5. A truck tire having a tread constructed with circumferential groups of diagonally disposed non-skid traction ribs, the ribs of successive groups being inclined alternately in opposite directions at approximately 45° from the centerline of the tire, and a diagonal rib disposed between adjacent groups, the inner ends of the ribs of each group being joined to said rib between adjacent groups.

ALBERT HARGRAVES.